May 25, 1965     H. A. DUDLER     3,185,251

INDUSTRIAL STETHOSCOPE

Filed Jan. 21, 1964

Hans A. Dudler    INVENTOR.

BY Ezekiel Wolf, Wolf & Greenfield

ATTORNEYS 3,185,251
INDUSTRIAL STETHOSCOPE
Hans A. Dudler, Wellesley Hills, Mass., assignor to Cardiosonics Medical Instruments Corporation, Belmont, Mass., a corporation of Massachusetts
Filed Jan. 21, 1964, Ser. No. 339,284
5 Claims. (Cl. 181—24)

The present invention relates to an acoustical device and more particularly to a stethoscope.

While the present invention has a number of uses, it is particularly adapted for use as an industrial stethoscope. Industrial stethoscopes are designed for testing and detecting defects in a variety of industrial equipment, such as pumps, generators, engines, compressors, converters and electric motors. Such stethoscopes are capable of detecting misalignments, excessive wear and vibration, leaks, nonuniformity of all types and other problems, which, but for the stethoscope, would require considerable effort to investigate.

Such stethoscopes may detect, distinguish and evaluate abnormal or unusual sounds or vibrations from the usual or expected. Because such stethoscopes may be used to isolate and amplify sounds, noise from a particular portion of a device may be isolated and compared, and in this manner, difficulties may be detected or tests conducted.

Although industrial stethoscopes have been used prior to the present invention, there is a need for stethoscopes of low amplitude having greater sensitivity and wider frequency ranges which may be made relatively economically, for accurate sound reproductions. It is therefore an object of the present invention to provide a stethoscope of simple and inexpensive construction which may be made easily and which will provide a device capable of accurately reproducing sounds of low volume or intensity and over a wide frequency range.

These and other objects and advantages of the present invention wil be more clearly understood when considered in conjunction with the accompanying drawings in which.

Figure 1:
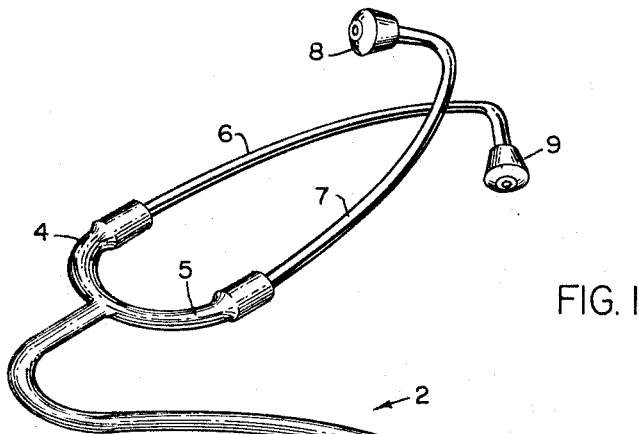
FIG. 1 is a perspective view of a stethoscope head embodying the present invention.

As illustrated in the drawings, the stethoscope head 1 is connected to frequency transducing means 2 which may comprise a flexible tubing 3 suitably secured, as for example by a sleeve fit, to the stethoscope head 1 at one end. The other end of the tubing 3 is divided into a pair of integral extensions or arms 4 and 5, forming a Y-shaped arrangement. The arms 4 and 5 are each in turn connected to one end respectively of the rigid tubular members 6 and 7. These members 6 and 7 have ear pieces 8 and 9 secured to their other ends. This construction may be of the type illustrated in U.S. Letters Patent No. 3,108,652 issued October 10, 1962. The stethoscope head may also be connected to other suitable audio transducers depending upon the particular application for which this device is intended. For example, the stethoscope head 1 may be connected by a flexible rubber or plastic tube to an audio-electric transducer and an electrical amplifier for amplification of the vibrations transmitted through the tube. The signal thus generated may then be displayed visually or acoustically by suitable means.

Figure 2:
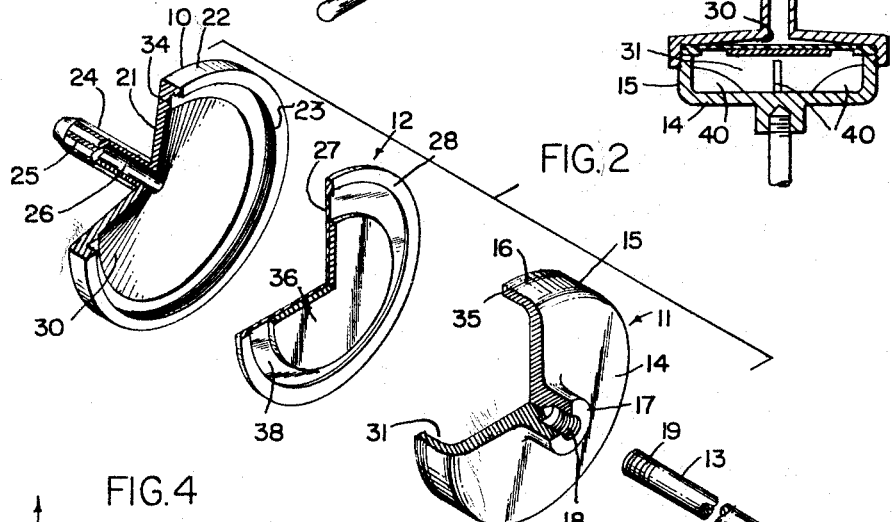
FIG. 2 is an exploded perspective view of the stethoscope head embodying the present invention.

The stethoscope head 1 is preferably formed of the components shown in the exploded view of FIG. 2. These include a cover 10, a casing 11, means 12 which includes a diaphragm and inertia mass, and a probe 13.

The casing 11, cover 10 and probe 13 are preferably all formed of a suitable metal such as aluminum or steel. The casing 11 has a bottom 14 with integral and continuous side walls 15 which preferably form the casing into a shallow cylindrical shape. The side walls 15 are provided with means for securing the cover 10 to the casing 11, preferably in the form of screw threads 16 at the upper outer edge of the side walls 15. The bottom 14 is preferably provided with a boss or projecting portion 17 coaxial with the cylindrical bottom 14. This portion 17 is provided with a threaded opening 18 that does not extend through the bottom 14, into which the threaded end 19 of the probe 13 is threaded to secure the two elements together. In some cases, the threaded opening 18 may extend entirely through the bottom 14. The cover 10 is formed with a top 21 and a peripheral integral continuous depending shallow lip 22. The lip 22 is formed with screw threads 23 on its inner surface adapted to threadingly engage the threads 16 of the casing 11. A tubular member 24 extends outwardly from and preferably coaxial with the top 21. The member 24 may be integral with the top 21. The outer surface of the free end of the tubular member 24 may be splined, serrated, or otherwise roughened as indicated at 25 to receive and securely engage one end of the tube 3. An opening 26 extends through the tube 24, and is connected to the chamber formed by the cover 10 and casing 11 when they are threaded together, as illustrated in FIG. 1.

The means 12 may be formed of a flexible resilient material, such as nylon or "Teflon," which is preferably nonpermeable, and is shaped into a thin flexible diaphragm having an outer diameter conformed to and slightly smaller than the inner diameter of the lip 22. The periphery of the diaphragm 27 is reinforced by a relatively stiff ring 28 of relatively rigid plastic material which may be formed, as illustrated, by a ring of the same material as the diaphragm 27 but of substantially greater thickness. The ring 28 is positioned within the head and is secured within the chamber formed by the cover 10 and casing 11. The diaphragm 27 divides the chamber formed by the casing 11 and cover 10 into an upper section 30 and a preferably larger lower section 31. The diaphragm 27 is rigidly secured to the casing and cover by suitable means. In the preferred embodiment this may be done by threading the casing 11 to the cover 10 with sufficient tightness so that ring 28 is sandwiched in facing relation between and rigidly engaged by a peripheral shoulder 34 formed on the inner surface of the cover 10 immediately adjacent the lip 22 and the upper surface 35 of the side wall 15. An inertia mass 36 of suitable metal such for example as brass or steel, is preferably formed as a flat disc which is secured to the diaphragm 27 on the side facing the probe. This mass 36 preferably has a diameter greater than the radius of the diaphragm 27 and is preferable uniformly spaced from the periphery of the diaphragm 27 leaving a uniform width 38 about the mass 36.

Figure 3:
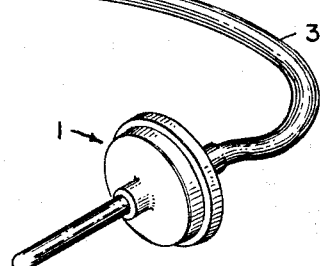
FIG. 3 is a cross-sectional elevation of the stethoscope head viewed in FIG. 2 with certain modifications and FIG. 4 is a graphic representation of typical sensitivity versus frequency of vibration of devices made in accordance with the present invention.

In a modification of the invention as illustrated in FIG. 3, the construction is similar to that illustrated in FIG. 2 in all respects except that in FIG. 3, there is provided a series of radial fins 40 which extend from the bottom 14 to the side wall 15 about the casing. These radial fins 40 are designed to eliminate resonance phenomena in the stethoscope head. It will be noted in the embodiment of FIG. 3 that the upper chamber 30 is also preferably substantial smaller in volume than the lower chamber 31.

In the operation of this device, probe 13 transmits vibratory motion from the object under investigation to the housing formed of the cover 10 and casing 11. If the frequency of vibration is substantially below the cut-off frequency, $f_c$, as determined by the equation $$f_c = \frac{1}{2\pi}\sqrt{\frac{K}{M}}$$

where M is the mass of the diaphragm load, and K is the stiffness of the diaphragm suspension, then the loaded diaphragm formed of the inertia mass 36 and diaphragm 27 is capable of following the vibration. Under these conditions no change in the actual volume of the upper section 30 takes place, and therefore no sound pressure is generated in the enclosed chamber formed by the upper section 30. Nor would there be any change in the volume contained in the flexible tubing 3, the volume of the tubular members 24 and consequently there would be no change in the air pressure in the ear. If, however, the frequency of vibration is substantially higher than the cut-off frequency, $f_c$, then, by virtue of the inertia of the heavy disc or mass 36 bonded to the elastic diaphragm 27, the diaphragm portion bonded to the disc or mass 36 will remain stationary although the housing vibrates. Thus, the active volume of the upper section 30 changes in accordance with the housing vibration and a sound pressure proportional to the probe displacement is generated and transmitted to the ear by means of the flexible tubing 3.

The sensitivity of the device is defined as the ratio of sound pressure amplitude in the ear volume to displacement amplitude of the probe 13 and is given by the following equation:

$$= \frac{gc^2 A}{V_g + L A_T + V_e}$$

where $g$ equals density of air, $c$ equals velocity of sound in air, $A$ equals active area of diaphragm, $V_g$ equals active volume (9), $L$ equals length of flexible tubing, $A_T$ equals a cross-sectional area of the flexible tubing and $V_e$ equals the ear volume.

In order to make the effective area of the diaphragm as large as possible, mass 36 is formed as a flat circular disc which is bonded in face to face relation with the flexible diaphragm 27 and is provided with a diameter at least as great as the radius of the diaphragm 27 and preferably with a diameter which is almost as large as the inner diameter of the housing, leaving only a small circular ring or spacing 38 of flexible material for the elastic suspension of the mass 36.

Figure 4:
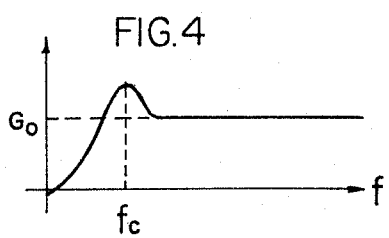

In the operation of this device sensitivities of the nature schematically illustrated in FIG. 4 are attainable. There is illustrated a plot of sensitivity versus frequency vibration, disregarding the transmission characteristics of the flexible tubing.

What is claimed is:

1. In a stethoscope for detecting vibrations above a frequency cut-off in the audio range comprising, a metal casing having a bottom section with continuous closed sidewalls and an integral continuous closed bottom wall, and a cover section having an opening formed therein with said cover secured to said sidewalls and forming an enclosed chamber, said bottom section and said cover section being rigidly secured together so that they will vibrate together, a diaphragm with a continuous outer edge and having stiffness of sufficient magnitude to follow vibrations above said frequency cut-off and positioned within and extending across said chamber with the periphery thereof secured to said sidewalls to divide said chamber into upper and lower sections, with said upper and lower sections completely isolated from each other by said diaphragm and with the lower section completely enclosed, said diaphragm formed of a flexible self-supporting material, a mass secured directly to and engaging only said diaphragm with said mass having an inertia of sufficient magnitude to be substantially nonresponsive to vibrations above said frequency cut off, said mass having a substantially circular face extending over said diaphragm near to said diaphragm edge defining a substantially annular portion of said diaphragm, said face being bonded in engaging relationship with said diaphragm throughout an adjacent surface of said diaphragm, and means on said housing for securing a probe to the outer surface of said bottom section.

2. A stethoscope as set forth in claim 1 wherein said mass is formed of a disc having a diameter greater than the radius of said diaphragm.

3. A stethoscope as set forth in claim 2 wherein said diaphragm is formed with a stiff rim integral with the periphery of and having a thickness greater than said diaphragm.

4. A stethoscope as set forth in claim 3 wherein said cover has an integrally formed depending lip about its periphery with complementary threads on said lip and sidewalls for interengaging said cover and bottom section, and means formed in part by said cover and bottom section for engaging and clamping said rim.

5. A stethoscope as set forth in claim 1 wherein said bottom wall of said bottom section is substantially planar and has a surface area substantially equal to the surface area of said diaphragm.

References Cited by the Examiner
UNITED STATES PATENTS

| | | | |
|---|---|---|---|
| 1,305,237 | 5/19 | Rayder | 181—24 |
| 1,540,585 | 6/25 | Abbott | 181—24 |
| 1,657,078 | 1/28 | Frederick et al. | 181—24 |
| 1,811,558 | 6/31 | Porter | 181—24 |
| 2,755,880 | 7/56 | Hoffmann | 181—24 |

LEO SMILOW, *Primary Examiner.*